United States Patent [19]
Ross

[11] Patent Number: 4,818,414
[45] Date of Patent: Apr. 4, 1989

[54] SLIME CONTROL FOR PRIMARY FILTRATION SYSTEMS

[75] Inventor: David S. Ross, Lorain, Ohio

[73] Assignee: Zimpro/Passavant Inc., Rothschild, Wis.

[21] Appl. No.: 173,704

[22] Filed: Mar. 25, 1988

[51] Int. Cl.$^4$ .......................................... B01D 23/24
[52] U.S. Cl. ..................... 210/744; 210/764; 210/794; 210/104; 210/108; 210/203; 210/275; 210/314
[58] Field of Search ................. 210/744, 752–756, 210/758, 759, 764, 765, 779, 786, 790–798, 805–808, 86, 103–105, 108, 134, 203, 205, 206, 258, 266, 269, 275–277, 279, 314, 316, 318, 741

[56] References Cited

U.S. PATENT DOCUMENTS

| | | | |
|---|---|---|---|
| Re. 28,456 | 7/1975 | Ross | 210/80 |
| 3,459,302 | 8/1969 | Ross | 210/796 |
| 3,478,880 | 11/1969 | Harris | 210/794 X |
| 3,516,930 | 6/1970 | Ross | 210/694 |
| 3,587,861 | 6/1971 | Ross | 210/277 |
| 3,792,773 | 2/1974 | Ross | 210/779 X |
| 3,817,378 | 6/1974 | Ross | 210/744 |
| 3,840,117 | 10/1974 | Ross | 210/794 |
| 4,028,241 | 6/1977 | Davis et al. | 210/793 X |
| 4,032,443 | 6/1977 | Ross | 210/795 |
| 4,113,613 | 9/1978 | Sekoulov et al. | 210/794 X |
| 4,127,485 | 11/1978 | Baker et al. | 210/275 X |
| 4,202,768 | 5/1980 | De Longe et al. | 210/794 X |
| 4,228,000 | 10/1980 | Hoeschler | 210/793 X |
| 4,487,689 | 12/1984 | Galaj | 210/108 |
| 4,547,286 | 10/1985 | Hsiung | 210/792 X |
| 4,608,181 | 8/1986 | Hsiung et al. | 210/795 X |
| 4,627,923 | 12/1986 | Ross | 210/744 |
| 4,693,831 | 9/1987 | Garzonetti | 210/744 |

FOREIGN PATENT DOCUMENTS 1181698  1/1985  Canada .................................. 182/99

OTHER PUBLICATIONS

Balmat, J. L.; "Biochemical Oxidation of Various Particulate Fractions of Sewage", *Sewage and Industrial Wastes*, vol. 29, No. 7, pp. 757–761, Jul., 1957.

Matsumoto et al.; "Filtration of Primary Effluent", *Journal Water Pollution Control Federation*, vol. 54, No. 12, pp. 1581–1591, Dec., 1982.

Levine et al.; "Characterization of the Size Distribution of Contaminants in Wastewater: Treatment and Reuse Implications"; *Journal Water Pollution Control Federation*, vol. 57, No. 7, pp. 805–816; Jul., 1985.

Brown, D. S.; "Evaluation of a Pulsed Bed Filter for Filtration of Municipal Primary Effluent", *Journal Water Pollution Control Federation*, vol. 59, No. 2, pp. 72–78, Feb. 1987.

Primary Examiner—Tom Wyse
Attorney, Agent, or Firm—Tipton L. Randall

[57] ABSTRACT

A process and apparatus for protecting a media bed filter with underlying support screen from solids contained in a liquid, such as filtrate from the filter, used to regenerate or backwash the media bed filter. Filtrate enters a first collection chamber containing a screen assembly covering one outlet, the chamber also containing a second outlet. Filtrate traverses the screen assembly and is transferred to a second collection chamber with addition of a predetermined amount of bactericide to prevent solids growth therein. Upon bactericide-treated filtrate reaching a predetermined level within the second chamber, filtrate in the first chamber bypasses the screen assembly and flows out the second output to further biological treatment or use. Bactericide-treated filtrate from the second collection chamber is used to regenerate or backwash the media bed filter with addition of optional surfactant to assist in cleaning the filter media and underlying support screen. The first collection chamber has an alarm system which detects resistance of filtrate flow traversing the screen assembly and warns that the screen assembly requires cleaning or replacement, thus fully protecting the support screen from solids.

52 Claims, 6 Drawing Sheets

SLIME CONTROL FOR PRIMARY FILTRATION SYSTEMS

The present invention pertains to the art of filtering primary waste water effluent, and more particularly to a structure for retaining waste filtrate and a method of treating and using the same. Very effective waste water filters have been developed and described in applicant's prior U.S. Pat. Nos. 3,459,302; 3,516,930; 3,587,861; 3,792,773; 3,817,378; 3,840,117; 4,032,443; 4,627,923; and Re. 28,458. These patents are incorporated by reference herein to the general art to which the present invention is directed.

BACKGROUND

The unit processes that are commonly utilized in the treatment of waste water have changed only moderately over the last fifty years. The changes have been primarily in design of apparatus, operating techniques and materials, resulting in increased dependability and efficiency. The intent and function of the unit processes remained unchanged.

The development of the "pulsed bed filter" and the "hydraulically regenerated filter" both described in U.S. Pat. Nos. 3,459,302; 3,516,930; 3,587,861; 3,792,773; 3,817,378; 3,840,117; 4,032,443; 4,627,923; 4,693,831; Re. 28,458 and Canadian Pat. No. 1,181,698 have made the unit process of primary filtration a practical, viable, and an effective unit process.

The development and application of primary filtration as a unit process has prompted the in-depth study of the size, character, distribution and polluting effect of the solids suspended in waste water prior to and following filtration. These studies involved the character and quantities of suspended particles that can be removed by the filtration process and their effect in the water treatment process, as well as the character, quantities, treatment and polluting effect of the solids retained within the filtrate.

The analytical standard method for the examination of water and waste water is prepared and published jointly by the American Public Health Association, the American Water Works Association, and the Water Pollution Control Federation. The sixteenth edition, published in 1985, describes the standard and accepted method of suspended solids determination. The key element in the determination is the use of a glass fiber filter disk such as Whatman grade 934AH, Gelman A/E, or a Millipore AP40. These filter disks are generally effective in the removal of solids greater than 1.2 microns. The suspended solids that pass through the filter disk have been considered nonexistent and labeled as soluble, and a biochemical analysis of the filtrate is referred to as the soluble $BOD_5$ or the soluble carbonaceous biological oxygen demand (CBOD).

The utilization of the pulsed bed or surface regeneration filter in the filtration of primary effluent results in substantial reductions of suspended solids, and a corresponding decrease in the organic residual in the filtrate. The filter performance can be expressed by $BOD_5$ and suspended solids evaluation of influent and filtrate.

In a study conducted at University of California, Davis, presented at the 53rd Annual Water Pollution Control Federation 1980 meeting, Matsumato, et al established that suspended solids removals by the primary filtration process (as determined by Standard Methods) are predictable. He reported removals of 30 to 75% depending on sand size and application rate. $BOD_5$ removal also varied from 28% to 63% under the same conditions.

The study printed in the *Journal Water Pollution Control Federation*, p. 1581-1591, Dec. 1982, contained an analysis (in FIG. 11) of solids contained in primary effluent, and in primary filtrate utilizing NUCLEOPORE polycarbonate filter papers. A significant conclusion is the fact that a relatively high quantity of solids, 1 micron and smaller, that are contained in the primary influent remain in the primary filtrate. This same study also establishes an effective removal of most of the solids greater than 2 microns in size utilizing 0.45 mm effective size sand. A detailed study entitled "Characterization of the Size Distribution of Contaminants in Wateswater: Treatment and Reuse Implications", by Levine, et al was presented at the 57th Annual Conference Water Pollution Control Federation in 1984 and published in the *Journal Water Pollution Control Federation*, p. 805-816, July, 1985. This study presented information on the impact of treatment processes on the size distribution of particles. This study also agreed with other researchers that particles smaller than 1.2 micron are generally not measured by the standard suspended solids tests, and a large number of bacterial cells, cell fragments, viruses and inorganic particles such as clay are in the size of 0.1 to 1.2 microns.

An earlier study by Balmat, published in *Sewage and Industrial Wastes*, Vol. 29, No. 7, p. 757-761, July, 1957, classified organic materials as soluble (<0.8 micron) colloidal (0.08 to 1.0 micron) supra-colloidal (1-100 micron) and settleable >100 micron. Balmat studied the oxidation rate of the various organic materials as referenced to size and determined that the biochemical oxidation rate $k\, d^{-1}$ (base, 10) increased from 0.09 and 0.08 for particles size over 1 micron to 0.22 for particles 0.08 to 1.0 micron.

It has been established in the reported studies that primary filtration is very effective in the removal of solids greater than 2 microns, with only minor removals of smaller particles. This change in the distribution of filtrate particles by the primary filtration process also results in a very rapid oxidation of the residual organics in the filtrate and allows rapid new cellular growth. This rapid growth rate is most desirable in downstream biological processes, but can be process defeating if uncontrolled. The new cellular materials have a tendency to attach to surfaces and may be recognized by their slimy appearance and reported as slime.

Primary filters have conventionally utilized their own filtrate to backwash, regenerate and clean the primary filter media. However rapid growth of cellular materials can, if not controlled, adversely effect the dependability and integrity of the primary filter system.

The term regenerate refers to the act of turning over of the uppermost layer of media in the filter bed to present clean media to the wastewater and to accumulate filtered separated solids within the filter bed. The "pulsed bed filter" regenerates the media bed by forcing filtrate into the vented underdrain chamber, and compressing the air within the filter support structure, which forces air upwardly through the bed to cause regeneration. The "hydraulically regenerated filter" employs an array of conduits within the filter bed having upwardly directed jets which regenerate the media surface by pumping filtrate through the conduits and jet assembly. Regeneration in both filters leaves the media bed essentially in tact and prolongs the filter run.

After a number of regeneration cycles, filter capacity has decreased to the point that the solids in the bed must be removed by backwashing the bed with filtrate. Both filters force filtrate into the underdrain chamber, up through the support screen and filter media, expanding and fluidizing the media and washing away the stored solids with the backwash filtrate. The combination of regeneration and backwashing may be considered together as renewal of the media bed filter.

A recent study entitled "Evaluation of a Pulsed Bed Filter for Filtration of Municipal Primary Effluents" by Donald S. Brown, U.S.E.P.A. and published in the *Journal Water Pollution Control Federation.* p. 72–78, Feb. 1987 pointed out minor problems that had the potential to become major problems. One of the problems with the greatest potential to become a major problem was the rapid growth of biological slime. Further, as the growth builds on the media support membrane, uneven upward flow of backwash liquid produces uneven cleaning and reduced filter efficiency. Eventually buildup of growth on the membrane will plug the membrane, impede backwash liquid flow and perhaps even rupture the support membrane resulting in total failure of the filter. The use of primary filtration has been in operation for many years at Amherst, Ohio where the problems of biological growth were confirmed and studied. The problems pointed out by Brown also existed and were duplicated at Amherst, Ohio, and have been eliminated by my improvement in the apparatus and methodology of primary filtration.

This invention is not limited to use with "pulsed bed filters" and "hydraulically regenerated filters". In recent years filters with designs other than those described in my patents have been used to treat primary waste or highly organic waste. The surfaces of all granular material are ideal sites for attached growth activity. The backwashing of any such media filter with retained filtrate contaminated with new cellular growth can cause further difficulties by the solids-laden backwash being introduced upward through the support media allowing the bacterial growth to attach to the granular support layers, particularly the finer media particles, resulting in decreased filter performance and possible filter failure. Further, other media support systems may contain surfaces other than, or in addition to, granular material. These alternatives include blocks, flumes, tubes, and other curved and flat surfaces that also present ideal sites for attached growth. Periodic flushing of the underdrain systems with solids-free bactericide-treated liquid, as described in my invention, will retard the growth on these underdrain surfaces as well as on the granular systems, and the fine media system support.

SUMMARY OF THE INVENTION

An object of the invention is to provide a process and apparatus for protecting a media bed filter, particularly the filter bed media and media support structure, from solids which develop within a filtrate which is used to regenerate or backwash the filter bed. Bacterial growth which may occur during storage of filtrate for regeneration or backwashing is prevented by adding a bactericide to said filtrate.

Another object of the invention is to provide such a process and apparatus where filtrate which passes to further biological treatment is not treated with bactericide which would inhibit this further treatment.

Another object of the invention is to provide a screen assembly which intercepts solid materials contained in filtrate and produces a solids-free filtrate for use to regenerate or backwash said filter.

A further object of the invention is to provide an alarm system which indicates that excess solids have accumulated on the screen assembly and cleaning or replacement of the assembly is required Other aspects, advantages and objects of the invention will become apparent to those skilled in the art upon reviewing the following detailed description, the drawings and the appended claims.

In accordance with the preferred embodiment of the invention there is provided an improvement in the structure of a waste water filtering system of the type containing a tank having a lower portion, containing a filter media supported by a screen, having a filtrate outlet maintaining a level of filtrate in filter lower portion. A conduit directs the filtrate to a collection chamber, said chamber containing a controlled outlet and a screen device through which the filtrate may pass through and upward over a discharge proportioning weir. The level over the proporting weir shall actuate a pump forcing bactericide liquid proportional to the volume rate of filtrate passing over the weir into a retention chamber where said contained liquid is utilized to regenerate or backwash the media from time to time as required. The invention also includes a means to activate the controlled outlet from said chamber at times (or periods) that the level in the retention basin is less than required for subsequent use. The filtrate will cause growth to occur on the screen surface and on the walls within the collection chamber increasing the resistance through the screen assembly causing filtrate level exterior to the screen assemby to rise above the level flowing over the discharge proportioning weir. This rising level shall actuate a signal warning the operator that the growth has occurred and that the screen assembly has become partially blocked and should be cleaned or replaced, thus fully protecting the media support septum. The invention also includes a means for adding a surfactant to the retained filtrate to facilitate the flow of bacteriacide-treated filtrate backwash into the interstices of the media through reduction of the surface tension of the backwashing admixture.

In another embodiment, a pump is used to transfer bactericide-treated filtrate, which has traversed the screen assembly, to the retention chamber where the filtrate is utilized to regenerate or backwash the filter media. An alarm signal is produced by the difference in the levels of filtrate across the screen assembly exceeding a predetermined value.

In another embodiment, a single larger collection chamber with a screen assembly therein receives filtrate and bactericide. The bactericide-treated filtrate traverses the screen assembly and is transferred directly from the collection chamber to regenerate or backwash the filter media. The filtrate and bactericide may be introduced exterior to the screen assembly and the bactericide-treated filtrate transferred from within the screen assembly or the filtrate and bactericide may be introduced within the screen assembly and the bactericide-treated filtrate transferred from the collection chamber exterior the screen assembly. An increase in resistance to bactericide-treated filtrate traversing the screen assembly in either direction produces an alarm signal, thus fully protecting the medium support system.

PREFERRED EMBODIMENT

Figure 1:
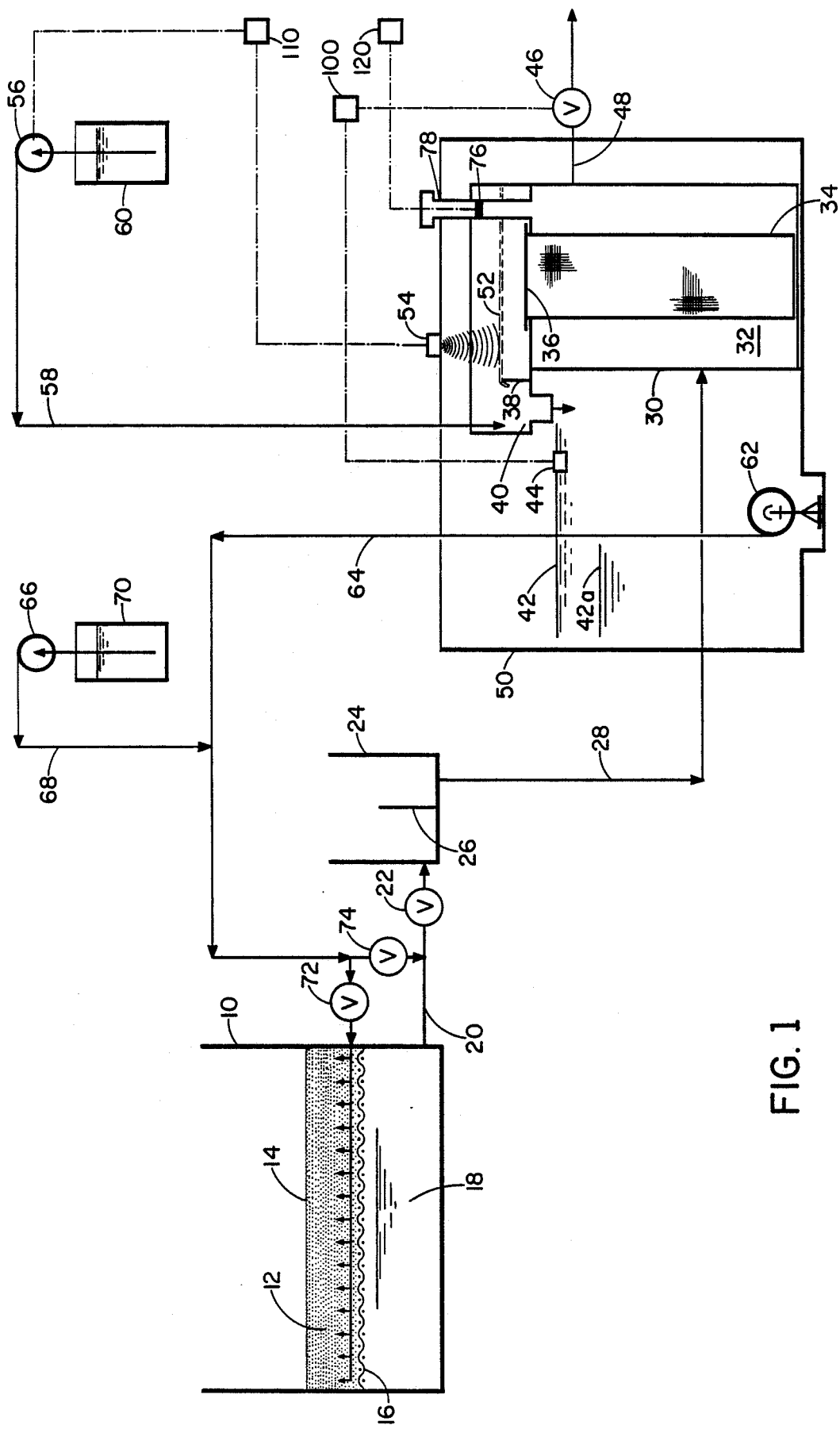
FIG. 1 is a view in side elevation showing the preferred embodiment of the invention in various stages of operation.

Referring now to the drawings wherein the showings are for the purpose of illustrating the preferred embodiment of the invention only and not for the purpose of limiting same. FIG. 1 illustrates a filter system assembly for filtering settled primary liquid prior to further biological treatment or use. In accordance with the preferred embodiment of the invention, the filter system assembly includes a tank 10, a subassembly of particulate media 12, with an upper surface 14, supported by an underdrain structure having a support and retention screen 16, the subassembly creating an underdrain chamber 18 at the bottom of tank 10. Unfiltered primary liquid enters the tank 10 and flows downward through the media 12 and screen 16 to the underdrain 18. Filtrate flows from the underdrain 18 through a conduit 20, containing a valve 22, to a vented level control chamber 24 which contains a wier 26, and through an outlet conduit 28 to a first collection chamber 30. Filtrate flows into the interior 32 of the chamber 30, through a removable screen assembly 34, upwardly through a first outlet 36, over a wier 38 into a mixing zone 40 and then to a second collection chamber or clearwell 50. The screen assembly 34 is made of screen material with openings of the same size or smaller than those of the retention screen 16. Although the screen assembly 34 may be of any shape, it is convenient to use a rectangular box frame of metalwork with screen material mounted on the four vertical sides and bottom and the open top fitted securely within the opening 36 of the collection chamber 30.

Filtrate will continue to fill the second chamber 50 until the rising liquid level 42 energizes a level sensor 44 which causes a controller 100 to open a valve 46 and allows filtrate to bypass the screen assembly 34 and flow from first chamber 30 though a conduit 48 and valve 46 to subsequent biological processes or use.

The filtrate flowing over the wier 38 creates a surface 52, said surface measured by an instrument 54, an ultrasonic device, and the flow calculated by a meter 110 which in turn controls the flow of bactericide liquid from a tank 60 delivered to the filtrate/bactericide mixing zone 40 by a pump 56 through a conduit 58. The proportion of bactericide added to filtrate is sufficient to prevent bacterial growth within the clearwell 50. An effective bactericide is a solution of sodium hypochlorite. Alternatively, bactericide liquid may be added directly to the clearwell 50 without contacting filtrate within the mixing zone 40 although the use of the mixing zone is preferred.

Periodically, a pump 62 is energized for the purpose of regeneration and/or backwashing of the filter media 12 by pumping bactericide-containing filtrate from the clearwell 50 via a conduit 64. At such times as the pump 62 is energized, (the flow rate of pump 62 is fixed) the surfactant pump 66 is also energized causing surfactant liquid, such as a detergent, to be delivered from a tank 70 via a conduit 68 to mix with bactericide-containing filtrate within the conduit 64. Backwashing or regeneration of the filter media 12 is accomplished by closing the valve 22 and opening either a valve 72 for regeneration or valve 74 for backwashing of the filter media in the hydraulically regenerated filter, or opening valve 74 only for both regeneration and backwashing of the pulsed bed filter. These processes are described in detail in my earlier patents.

The pump 62, when energized for regeneration or backwash, will cause the liquid level 42 within the clearwell 50 to fall away from the level sensor 44 to a lower level 42a. The sensor 44 in turn causes the controller 100 to close the valve 46 causing filtrate to again flow through the screen assembly 34, upward through the opening 36, over the weir 38 and, after addition of bactericide solution, finally into the clearwell 50, maintaining a reserve of treated filtrate for use in regenerating or backwashing of the filter media 12. This continues until the level sensor 44 is energized by the liquid level 42.

Filtrate containing minute organic particles and bacteria previously described entering the collection chamber 30, filling the tank volume 32 and passing through the screen assembly 34, will allow new cellular material to grow and attach itself to the interior walls of the tank 30 and on the surface of the screen assembly 34, thus reducing the porosity of the screen assembly 34. This reduction in porosity causes an increase in resistance to filtrate flow, causing the filtrate level external to the screen assembly 34 to rise to a point higher than the normal maximum liquid level 52 over the wier 38 in order to compensate for the additional resistance. In time growth on the screen and growth sloughed from the surface of the interior of conduit 28 and chamber 30 will further reduce the porosity of the screen assembly 34 and raise the filtrate level external to the screen assembly 34 such that a level switch 76 in an alarm assembly 78 is activated, causing an alarm 120 to sound. The screen assembly 34 may then be replaced or cleaned and protection of the filtration system from particles maintained.

Figure 2:
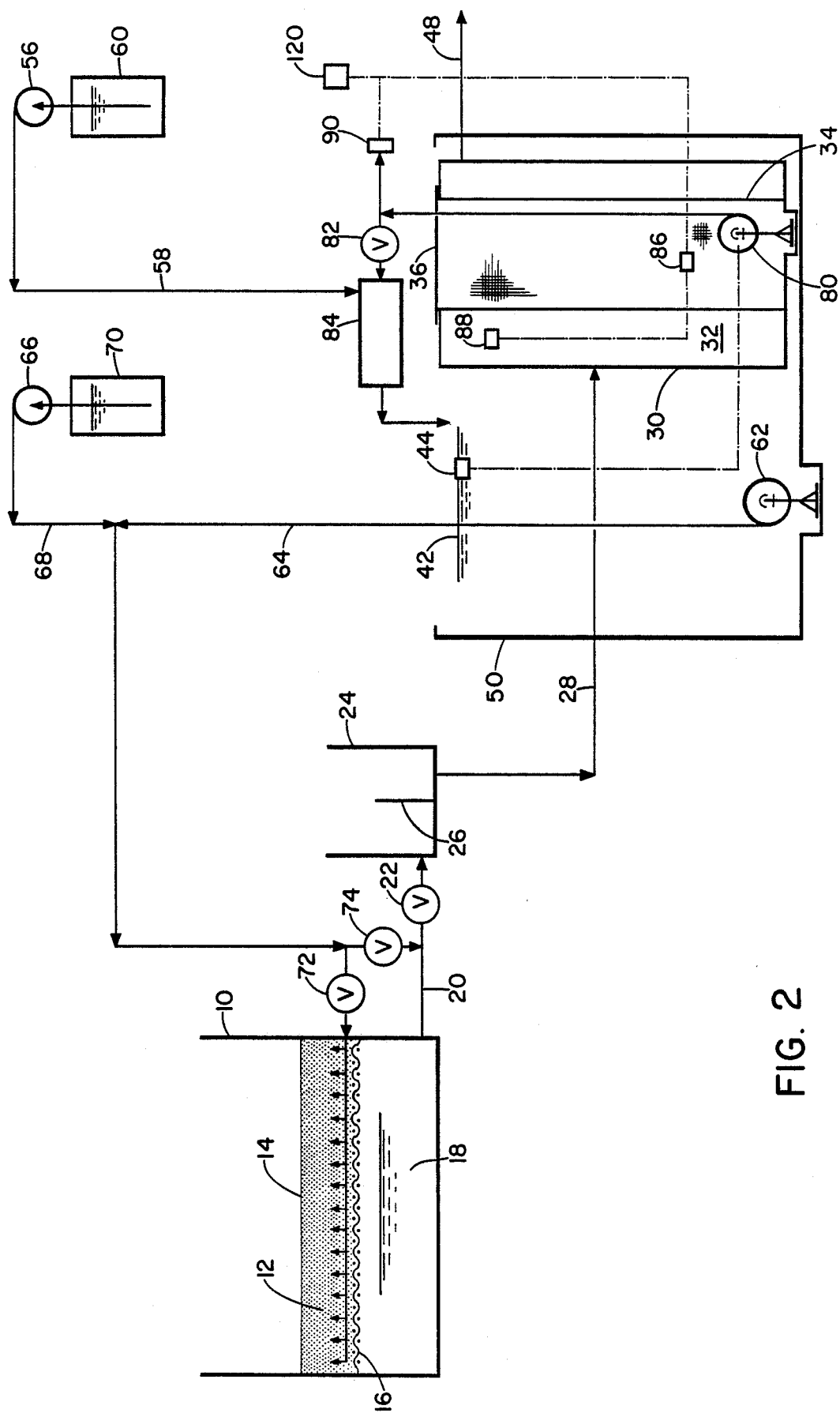
FIG. 2 is a view in side elevation illustrating another embodiment of the invention.

FIG. 2 illustrates a primary filter system assembly with the granular media bed filter discharging filtrate via the conduit 28 to the collection tank 30 as described in FIG. 1. The modification in FIG. 2 is in the construction and operation of the collection tank 30 wherein a pump 80 has intake located within the screen assembly 34, said pump 80 discharging filtrate at a fixed rate, as set by a valve 82, thus eliminating the need to measure the rate of flow to the tank 30 for purpose of adding a fixed ratio of bactericide to filtrate. As the pump 80 delivers a constant flow of filtrate to a static mixer 84, a bactericide solution pump 56 provides a fixed ratio of bactericide solution to the mixer 84 via a conduit 58. The bactericide and filtrate are thoroughly mixed in the static mixer 84 and the admixture discharged to the clearwell 50, as in FIG. 1. The liquid level 42, upon rising in the clearwell 50, will energize the liquid level sensor 44 which will de-energize the pump 80 and the bactericide addition pump 56 allowing the liquid level in the collection chamber 30 to rise and flow out through the conduit 48 to subsequent biological processes or use. The clearwell pump 62 and the surfactant addition pump 66 will operate to discharge bactericide-treated filtrate to the media bed filter as described in FIG. 1.

A further modification of the screen assembly porosity alarm is the location of a level sensor 86 within the screen assembly 34 and a level sensor 88 exterior the screen assembly and above the fixed level of the sensor 86, for the purpose of sensing the porosity or resistance of the screen assembly 34 to liquid flow. Should the sensors 86 and 88 indicate a liquid level differential across the screen assembly greater than the height separating the sensors, this situation shall sound the alarm 120.

A further modification is the installation of a level switch 90 limiting alarm which prevents the pump 80 from completely emptying the chamber 30.

Figure 3:
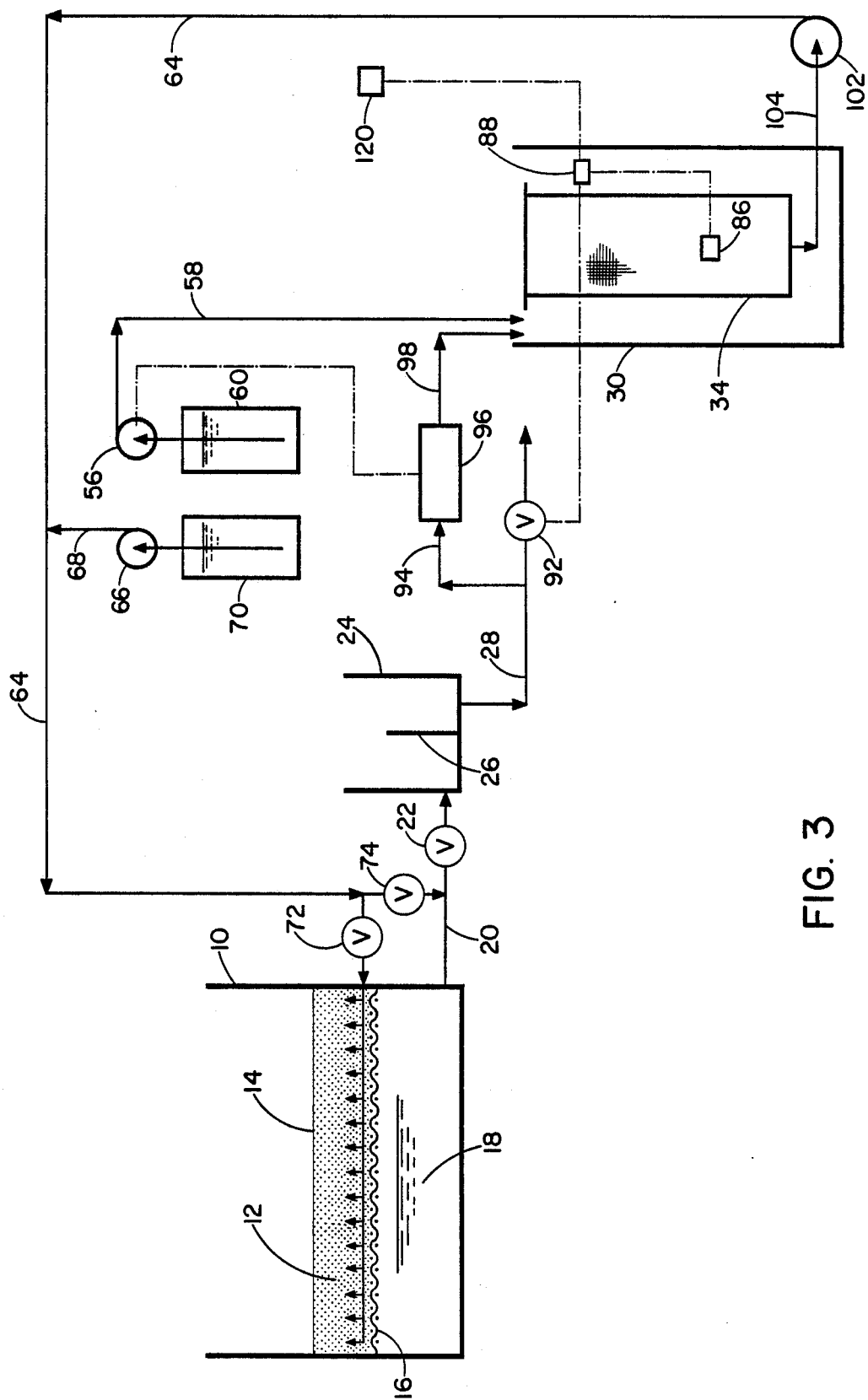
FIG. 3 is a view in side elevation showing a further embodiment of the invention.

FIG. 3 represents another embodiment of the invention wherein the granular media bed filter discharges filtrate to the conduit 28 as described in FIG. 1. In this embodiment filtrate flowing through the conduit 28 flows directly to further biological treatment or use. The conduit 28 contains an outlet valve 92 which is controlled by the liquid level sensor 88 in the collection vessel 30, which has been increased in size to contain sufficient liquid for the regeneration and backwash cycles. As the liquid level in the collection chamber 30 is lowered, the liquid level sensor 88 will cause the valve 92 to close causing filtrate to flow through a conduit 94, a meter 96 and via a conduit 98 into the collection chamber 30. The meter 96 in turn causes the bactericide pump 56 to deliver a fixed ratio of bactericide liquid via the conduit 58 to the collection vessel 30. Filtrate and bactericide liquid enter the chamber 30 exterior to the screen assembly 34 which is modified such that a backwash pump 102 draws bactericide-treated filtrate from the interior of the screen assembly 34. A simple flanged opening on the bottom of the screen assembly 34 which can accomodate a conduit 104 from the pump 102 provides for this feature. This embodiment introduces bactericide into the chamber 30 exterior to the screen assembly 34 and tends to keep the screen assembly free of new cellular growth.

The backwash pump 102 may be located in a drywell outside of the chamber 30 for purposes of backwashing and regeneration of the filter media 12. The surfactant delivery pump 66 and the backwash pump 102 will operate simultaneously for the purpose of filter regeneration and backwash. The level sensors 86 and 88 are located as described in FIG. 2 and function as so described.

Figure 3A:
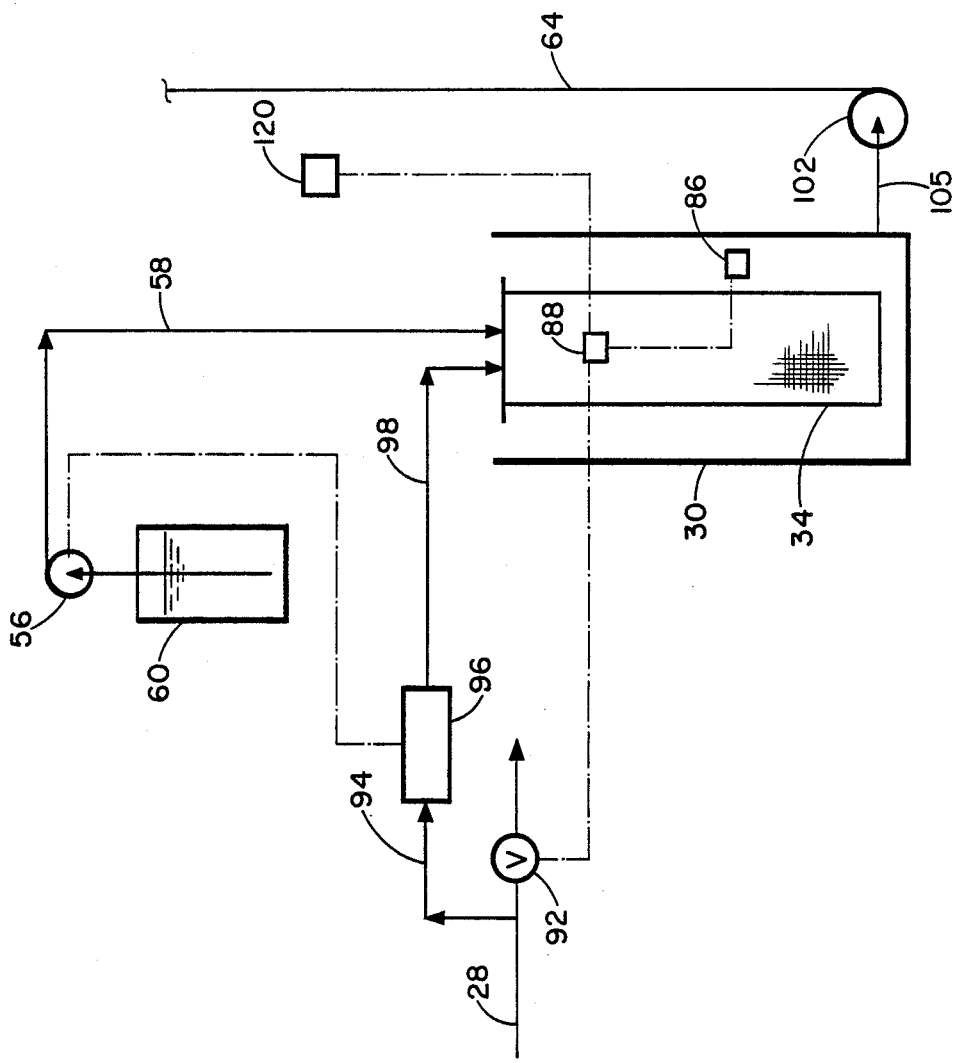
FIG. 3a is a view in side elevation showing an alternative embodiment of the invention.

FIG. 3a illustrates a modification of the piping and level sensors in the collection chamber 30 of FIG. 3. In FIG. 3a the upper level sensor 88 is interior the screen assembly 34 and the lower level sensor 86 is exterior the assembly 34 but interior the chamber 30. Closing of the valve 92 by the liquid level within the screen assembly dropping below the level sensor 88 causes filtrate and bactericide to enter the chamber 30 as in FIG. 3. In FIG. 3a the filtrate and bactericide are introduced within the screen assembly 34 and the bactericide-treated filtrate traverses this assembly. The backwash pump 102 draws bactericide-treated filtrate from the chamber 30 exterior the screen assembly 34 via the conduit 105 and delivers the admixture to the filter via the conduit 64 as described in FIG. 3.

The growth or collection of solids within the screen assembly 34 will result in resistance to flow across the screen assembly as bactericide-treated filtrate is withdrawn from the chamber 30. A liquid level difference between the interior and exterior of the screen assembly 34 greater than the difference in height between the level sensor 86 and 88 will activate the alarm 120.

Although the screen assembly 34 may be more difficult to clean when used in the modification of FIG. 3a, the velocity of filtrate through the screen is not directly effected by operation of the pump 102. Further, the piping for FIG. 3a is somewhat simplified.

Figure 4:
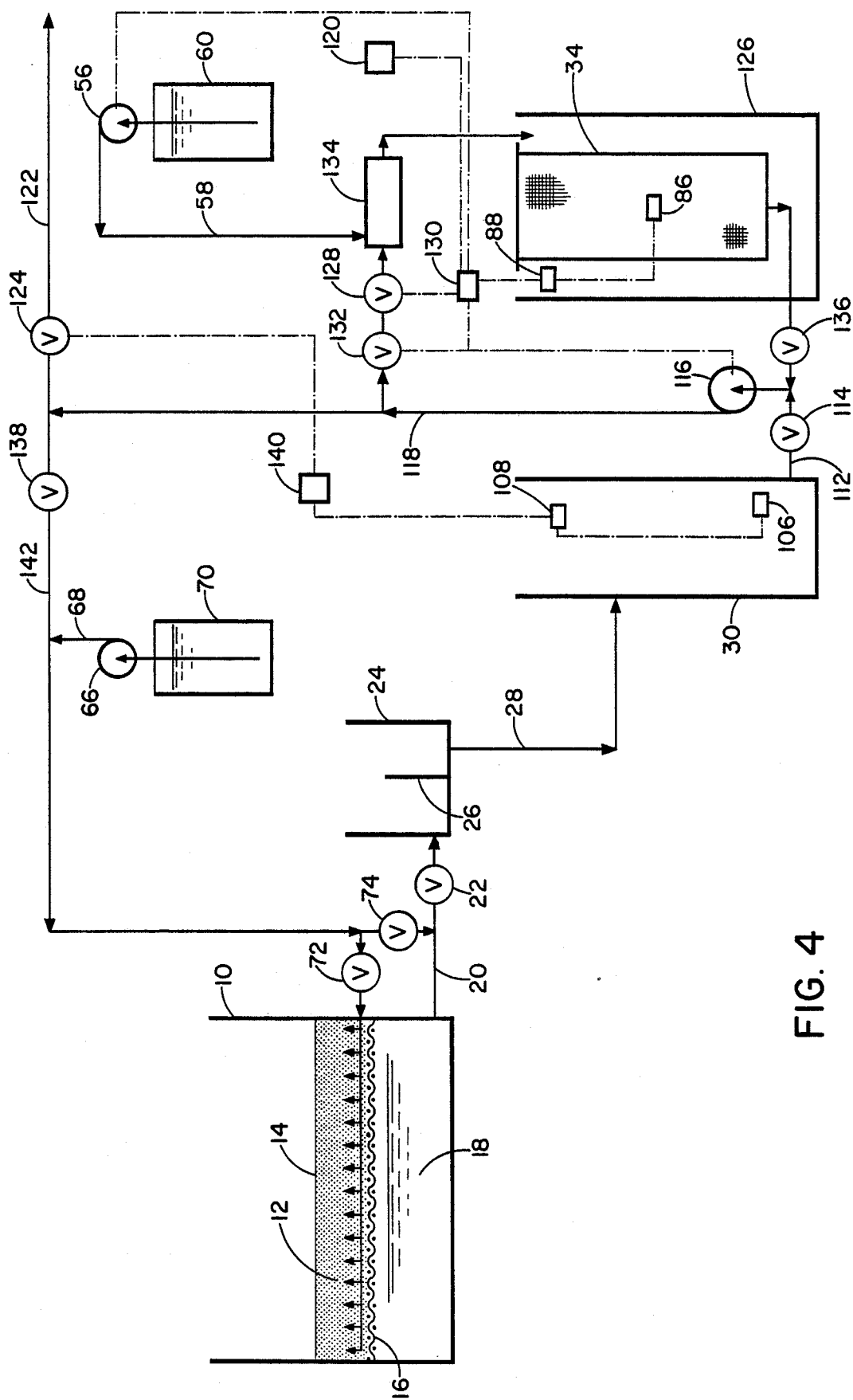
FIG. 4 is a view in side elevation showing a further embodiment of the invention.

FIG. 4 illustrates another embodiment of the invention. Liquid flows through the granular filter media 12 and on to the conduit 28 as previously described. Filtrate flows from the conduit 28 into a containment vessel 30 wherein are located two level sensors 106 and 108. Filtrate is drawn from the vessel 30 via a conduit 112, controlled by a suction valve 114, to a backwash pump 116. This pump 116 performs multiple functions including 1) pumping filtrate to subsequent biological processes or use; 2) mixing filtrate with bactericide at a fixed ratio for use in the backwash or regeneration of the filter media 12 and; 3) delivery of bactericide treated filtrate plus a surfactant to the filter for regeneration or backwashing of the granular filter media 12.

The first function is accomplished by drawing filtrate from the vessel 30 via the conduit 112 and the valve 114, and pumping the filtrate through the conduits 118 and 122 controlled by a valve 124, to subsequent biological processes or use.

The second function is accomplished as follows. A retention basin 126 stores bactericide treated fltrate for regeneration or backwash of the filter. The basin 126 is equipped with a screen assembly 34, a level sensor 88 exterior to the assembly 34 and a level sensor 86 within said assembly. When the level of backwash liquid within the basin 126 falls below the level sensor 88, a controller 130 opens a valve 128 and activates the bactericide pump 56. Filtrate flows from the pump 116 via the conduit 118, through the fixed valve 132 and the valve 128 to mix with bactericide in a static mixer 134 and then to the basin or clearwell 126, exterior to the screen assembly 34. As the liquid level within the clearwell 126 rises to the level sensor 88, the controller 130 closes the valve 128 and deactivates the pump 56.

The third function, filter regeneration or backwash, is achieved by closing the valve 124 and opening the valves 136 and 138. The backwash pump 116 draws bactericide-treated backwash liquid from within the screen assembly 34 as described in FIG. 3. Backwash liquid flows through the conduit 118, through a valve 138 and a conduit 142. A surfactant is added to the liquid in the conduit 142 by energizing the surfactant pump 66 as described previously. The filter media 12 is regenerated or backwashed by opening the valves 72 or 74 respectively with the valve 22 closed. The level sensors 88 and 86 operate to indicate a decrease in porosity of the screen assembly 34 as described in FIGS. 2 and 3. The screen assembly 34 protects the pump 116, the filter medium 12 and the scree 16 from particles in backwash liquid and the resulting problems described earlier.

At periods when the clearwell level sensor 88 is energized, the valve 128 is closed and the vessel 30 is allowed to fill until the level sensor 108 is energized, causing the pump 116 to start, opening the suction valve 114 and the discharge valve 124. Should the liquid level in the vessel 30 fall below the level sensor 106, the pump 116 will shut down, with the valves 114 and 124 closed.

Figure 4A:
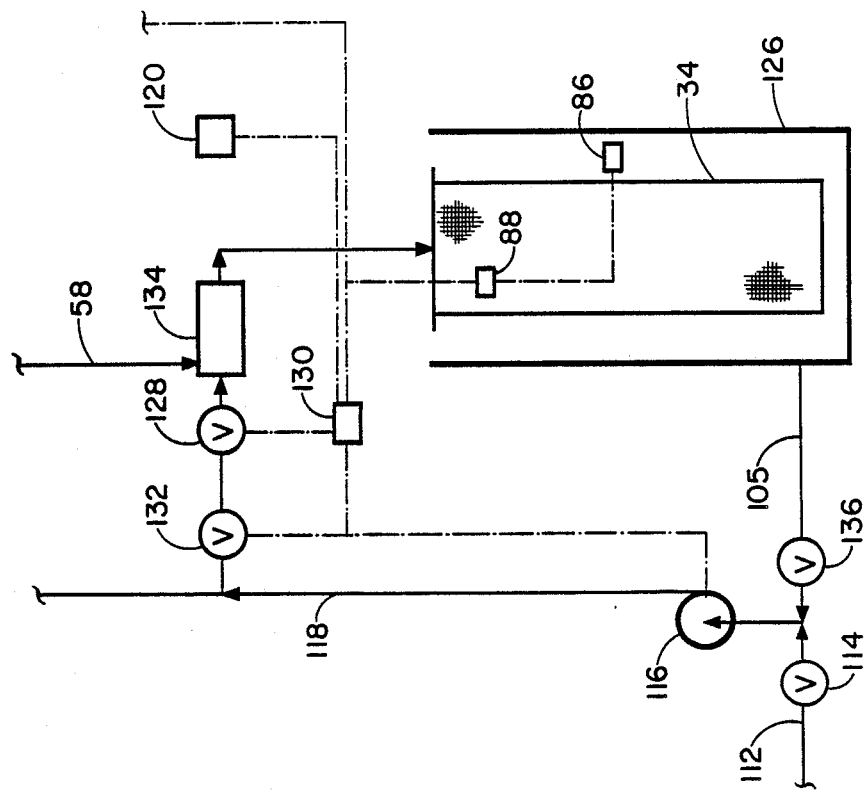
FIG. 4a is a view in side elevation showing an alternative embodiment of the invention.

FIG. 4a illustrates a modification of the piping and level sensors in the retention basin 126 of FIG. 4. In FIG. 4a the upper level sensor 88 is interior the screen assembly 34 and the lower level sensor 86 is exterior the assembly 34 but interior the basin 126. Dropping of the liquid level below the level sensor 88 causes the controller 130 to open the valve 128 and activate the pumps 116 and 56 to deliver filtrate and bactericide to the mixer 134 as in FIG. 4. The bactericide-treated filtrate enters the interior of the screen assembly 34 and the treated filtrate traverses this assembly. The backwash pump 116 draws bactericide-treated filtrate from the retention basin 126 exterior the screen assembly 34 via the conduit 105, through the valve 136, and delivers the admixture to the filter via the conduit 118 as described in FIG. 4.

The growth or collection of solids within the screen assembly 34 will result in resistance to flow across the screen assembly as bactericide-treated filtrate is withdrawn from the basin 126. A liquid level difference between the interior and exterior of the screen assembly 34 greater than the difference in height between the level sensors 86 and 88 will activate the alarm 120.

Although the screen assembly 34 may be more difficult to clean when used in the modification of FIG. 4a, the velocity of filtrate through the screen is not directly effected by operation of the pump 116. Further, the piping for FIG. 4a is somewhat simplified.

From the following description, one skilled in the art can easily acertain the essential characteristics of the invention and, without departing from the spirit and scope thereof, make various changes and modifications to adapt it to various usages.

I claim:

1. A process for control of the quality of a media bed filter regenerating or backwashing liquid, to protect the filter bed media and the media support structure from the deleterious effects of biological solids generated or retained within said liquid comprising the steps of;
   (a) introducing a filtrate from said media bed filter into a first collection chamber containing a removable screen assembly covering a first upper outlet, said chamber also containing a second lower outlet;
   (b) transferring filtrate which has traversed said screen assembly in said first collection chamber to a predetermined level within a second collection chamber;
   (c) adding a predetermined amount of bactericide to said filtrate which has traversed said screen assembly to retard bacterial growth therein, to form a bactericide-treated filtrate; and
   (d) regenerating or backwashing said media bed filter with said bactericide-treated filtrate to improve operation of said filter.

2. A process according to claim 1 comprising the additional step of;
   (e) bypassing said screen assembly, with said filtrate flowing through said second lower outlet in said first collection chamber, upon said bactericide-treated filtrate reaching said predetermined level within said second collection chamber.

3. A process according to claim 2 wherein said filtrate from said second outlet in step (e) receives further biological treatment.

4. A process according to claim 1 wherein said bactericide is a solution of sodium hypochlorite.

5. A process according to claim 1 wherein said transferring step (b) is by overflowing said filtrate from said first collection chamber to said second collection chamber.

6. A process according to claim 5 wherein said predetermined amount of bactericide added to said filtrate in step (c) is determined by measuring the overflow rate of filtrate from said first collection chamber to said second collection chamber.

7. A process according to claim 5 wherein said predetermined amount of bactericide in step (c) is added to the filtrate in a mixing zone prior to the filtrate entering said second collection chamber.

8. A process according to claim 5 wherein said predetermined amount of bactericide in step (c) is added to said filtrate within said second collection chamber.

9. A process according to claim 1 wherein said transferring step (b) is by pumping the filtrate from within said screen assembly from said first collection chamber to said second collection chamber.

10. A process according to claim 9 wherein said predetermined amount of bactericide added to said filtrate in step (c) is determined by the rate of pumping of filtrate from said first collection chamber to said second collection chamber.

11. A process according to claim 10 wherein said predetermined amount of bactericide and said filtrate flow through mixing means prior to the bactericide-treated filtrate entering said second collection chamber.

12. A process according to claim 1 wherein said regenerating or backwashing step (d) is by pumping said bactericide-treated filtrate from said second collection chamber.

13. A process according to claim 1 wherein a predetermined amount of a surfactant is added to said bactericide treated filtrate in regenerating or backwashing step (d) to assist in regenerating said media bed filter.

14. A process according to claim 13 wherein said surfactant is a detergent.

15. A process according to claim 1 wherein a resistance to said filtrate traversing said screen assembly in said first collection chamber in step (b) produces an alarm signal.

16. A process according to claim 15 wherein said alarm signal is produced by a first filtrate level exterior said screen assembly within said first chamber activating a level switch at a predetermined level exceeding a second filtrate level overflowing from said first chamber to said second chamber.

17. A process according to claim 15 wherein said alarm signal is produced by a first filtrate level exterior said screen assembly within said first chamber exceeding a third filtrate level within said screen assembly by a predetermined distance.

18. An apparatus for control of the quality of a media bed filter regenerating or backwashing liquid, to protect the filter bed media and the media support structure from the deleterious effects of biological solids generated or retained within said liquid comprising;
   a first collection chamber with a liquid inlet; a first liquid outlet containing a removable screen assembly; a second liquid outlet located below the level of said first liquid outlet; a second collection chamber; means for transferring liquid which has traversed said screen assembly to said second collection chamber; means for measuring the amount of liquid transferred from said first collection chamber to said second collection chamber; means for adding a predetermined amount of bactericide to said liquid entering said second collection chamber; control means for terminating transfer of liquid from said first chamber to said second chamber upon the liquid in said second chamber reaching a predetermined level; and means to deliver a bactericide-treated liquid to said media bed filter to regenerate or backwash said filter.

19. An apparatus according to claim 18 wherein said removable screen assembly is a rectangular box metalwork frame with a screen material mounted on four vertical sides and bottom of said frame, with an open top which fits securely within said first liquid outlet.

20. An apparatus according to claim 19 wherein said screen material contains openings no larger than the openings of a screen supporting the filter bed media.

21. An apparatus according to claim 19 wherein said screen material contains openings smaller than the openings of a screen supporting the filter bed media.

22. An apparatus according to claim 18 wherein said means for transferring liquid which has traversed said screen assembly to said second chamber is a valve which closes said second outlet in said first chamber causing liquid to overflow into said second chamber.

23. An apparatus according to claim 18 wherein said means for transferring liquid which has traversed said screen assembly to said second chamber is a pump with intake located within said screen assembly.

24. An apparatus according to claim 22 wherein said means for measuring liquid transferred to said second chamber is an ultrasonic device to measure the height of liquid level overflowing said first chamber to said second chamber.

25. An apparatus according to claim 23 wherein said means for measuring liquid tranferred to said second chamber is a control for said pump with intake located within said screen assembly.

26. An apparatus according to claim 18 wherein said means for adding a predetermined amount of bactericide to liquid entering said second chamber is a pump.

27. An apparatus according to claim 18 wherein said control means for terminating transfer of liquid from said first chamber to said second chamber is a level control sensor within said second chamber.

28. An apparatus according to claim 18 wherein said means to deliver a bactericide-treated liquid to said media bed filter is a pump.

29. An apparatus according to claim 18 further comprising means to add a surfactant to said bactericide-treated liquid as said liquid is delivered to said filter.

30. A process for control of the quality of a media bed filter regenerating or backwashing liquid, to protect the filter bed media and the media support structure from the deleterious effects of biological solids generated or retained within said liquid comprising the steps of;
(a) introducing a filtrate from said media bed filter plus a predetermined amount of bactericide into a first collection chamber with a removable screen assembly contained therein, to form a bactericide-treated filtrate;
(b) terminating the introduction of said filtrate and said bacteride to said first collection chamber upon said bactericide-treated filtrate reaching a predetermined upper level therein;
(c) regenerating or backwashing said media bed filter with said bactericide-treated filtrate from said first collection chamber which has traversed said screen assembly; and
(d) commencing the introduction of said filtrate and said bactericide to said first collection chamber upon said bactericide-treated filtrate dropping below said predetermined upper level therein.

31. A process according to claim 30 comprising the additional step of:
(e) adding a surfactant to said bactericide-treated filtrate in step (c) to assist in regenerating or backwashing said media bed filter.

32. a process according to claim 30 wherein said filtrate and said bactericide in step (a) are mixed prior to entering said first collection chamber.

33. A process according to claim 30 wherein said predetermined amount of bactericide added to said filtrate in step (a) is determined by measuring said filtrate's flow with a meter.

34. A process according to claim 30 wherein said predetermined amount of bactericide added to said filtrate in step (a) is determined by the flow rate of a pump introducing filtrate to said first collection chamber.

35. A process according to claim 30 wherein said filtrate and said bactericide of step (a) are introduced into said first collection chamber exterior to said removable screen assembly and said bactericide-treated filtrate of step (c) is withdrawn from within said screen assembly.

36. A process according to claim 30 wherein said filtrate and said bactericide of step (a) are introduced into said first collection chamber within said removable screen assembly and said bactericide-treated filtrate of step (c) is withdrawn from exterior said screen assembly.

37. A process according to claim 30 wherein a resistance to said bactericide-treated filtrate traversing said screen assembly in said first collection chamber in step (c) produces an alarm signal.

38. A process according to claim 37 wherein said alarm signal is produced by a difference in the levels of bactericide-treated filtrate across said screen assembly exceeding a predetermined value.

39. An apparatus for control of the quality of a media bed filter regenerating and backwashing liquid, to protect the filter bed media and the media support structure from the deleterious effects of biological solids generated or retained within said liquid comprising;
a first collection chamber with liquid inlet; a removable screen assembly contained therein; means for introducing liquid into said chamber; means for introducing a predetermined amount of bactericide into said chamber; control means for terminating introduction of liquid and bactericide into said chamber upon the liquid in said chamber reaching a predetermined level; means to deliver bactericide-treated liquid which has traversed said screen assembly to said media bed filter to regenerate or backwash said filter; and means to signal a resistance to bactericide-treated liquid traversing said screen assembly.

40. An apparatus according to claim 39 wherein said removable screen assembly is a rectangular box metalwork frame with a screen material mounted on four vertical sides and bottom of said frame, with an open top.

41. An apparatus according to claim 40 wherein said screen material contains openings no larger than the openings of a screen material supporting the filter bed media.

42. An apparatus according to claim 40 wherein said screen material contains openings smaller than the openings of a screen material supporting the filter bed media.

43. An apparatus according to claim 39 wherein said means for introducing liquid into said chamber is an outlet valve and a conduit which redirects filtrate from an outlet of said filter to said chamber.

44. An apparatus according to claim 43 wherein said means for introducing a predetermined amount of bactericide into said chamber is a pump controlled by a meter within said conduit which redirects filtrate from an outlet of said filter to said chamber.

45. An apparatus according to claim 43 wherein said control means for terminating introduction of liquid and bactericide into said chamber is a level switch which controls said outlet valve.

46. An apparatus according to claim 39 wherein said means to deliver a bactericide-treated liquid to said filter to regenerate or backwash said filter is a backwash pump and a conduit to said filter.

47. An apparatus according to claim 39 wherein said means to signal a resistance to bactericide-treated liquid traversing said screen assembly are upper and lower level sensors, one located interior said screen assembly and one located exterior said screen assembly with said upper level sensor located on the side of said screen assembly which receives said liquid and said bactericide.

48. An apparatus according to claim 39 wherein said means for introducing liquid into said chamber is a first pump which receives filtrate from said media bed filter.

49. An apparatus according to claim 48 wherein said means for introducing a predetermined amount of bactericide into said chamber is a second pump controlled by the operation of said first pump.

50. An apparatus according to claim 49 wherein said control means for terminating introduction of liquid and bactericide into said chamber is a level switch within said chamber which controls said first and said second pumps.

51. An apparatus according to claim 48 wherein said means to deliver bactericide-treated liquid which has traversed said screen assembly to said media bed filter to regenerate or backwash said filter is said first pump and a conduit to said filter.

52. An apparatus according to claim 39 further comprising means to add a surfactant to said bactericide-treated liquid as said liquid is delivered to said media bed filter.

* * * * *